(12) United States Patent
Underwood et al.

(10) Patent No.: US 8,102,667 B2
(45) Date of Patent: Jan. 24, 2012

(54) METHOD AND APPARATUS FOR SPATIALLY OPTIMIZING SURFACE MOUNT PADS ON A BALL GRID ARRAY PACKAGE

(75) Inventors: Jeffrey A. Underwood, Sunrise, FL (US); Thomas J. Swirbel, Davie, FL (US); Michael J. Watkins, Sunrise, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 705 days.

(21) Appl. No.: 12/259,250

(22) Filed: Oct. 27, 2008

(65) Prior Publication Data

US 2010/0101846 A1    Apr. 29, 2010

(51) Int. Cl.
*H05K 7/10* (2006.01)
*H05K 7/12* (2006.01)
*H05K 1/02* (2006.01)
(52) U.S. Cl. ........................................ 361/767; 174/259
(58) Field of Classification Search .................. 361/764, 361/767, 769
See application file for complete search history.

(56) References Cited

U.S. PATENT DOCUMENTS 6,285,560 B1 * 9/2001 Lyne .............................. 361/760

\* cited by examiner

*Primary Examiner* — Timothy Thompson
*Assistant Examiner* — Roshn Varghese
(74) *Attorney, Agent, or Firm* — Barbara R. Doutre

(57) ABSTRACT

Method and apparatus for spatially optimizing the arrangement of surface mount pads on a ball grid array package. An array containing T surface mount pads with a diameter less than or equal to 0.4 millimeter is arranged in an array of rows and columns less than or equal to 0.5 millimeters center-to-center. The array of pads is subdivided into N groups of pads respectively numbered $G_x$ (for X from 1 to N), each group containing $P_x$ pads (for X from 1 to N). Each pad in each group is located so as to maximize the number of empty spaces $S_z$ that are adjacent to each pad, where $S_z=(G_x-1)$. The number of fanout possibilities for each group $(P_x*S_z)$ is calculated, and then the total number of fanout possibilities, FP, is calculated using the function $\Sigma_1^N(P_x*S_z)$. The resulting spatially optimized pattern has a quality score, FP/T, that is equal to or greater than 2.

3 Claims, 4 Drawing Sheets

METHOD AND APPARATUS FOR SPATIALLY OPTIMIZING SURFACE MOUNT PADS ON A BALL GRID ARRAY PACKAGE

FIELD OF THE INVENTION

The present invention relates generally to semiconductor packages, and more specifically, to ball grid array packages and a method to spatially optimize the surface mount pads on the package.

BACKGROUND

Integrated circuit packages of the ball grid array (BGA) type are well known. Conventional BGA packages provide a rectangular or square array of connections on the underside of a multi-layer substrate, utilizing a solder ball located at each connector location. The BGA package is attached to a printed circuit board by reflowing the solder balls to make connection to conductors at the surface of the printed circuit board. The BGA package provides the important advantage of being self-aligning, as the surface tension of the solder will tend to pull the BGA package into proper alignment with the corresponding conductors on the printed circuit board.

There are many benefits to using the BGA package, however its greatest asset—the ability to provide an extremely dense array of thousands of pads—also turns out to be a tremendous problem for designers. The increasing number of pads and decreasing pitch (the center-to-center distance between pads) of the BGA array pattern has outpaced the ability to effectively design these devices. Maintaining signal integrity at high levels and reducing fabrication costs are two important requirements that are at odds with each other. Reducing crosstalk is generally accomplished by increasing the space between conductors, which can increase layer count, increase package size, and thus, fabrication cost. Routing the signal traces on dense BGA packages requires more stringent design rules and more layers in the substrate. Fine pitch high pad count BGAs have thus become difficult, if not impossible to route. If the BGA package has too many pads in a dense array, the only way to minimize the number of layers in the substrate is to utilize all the available space with a pattern of fanouts and traces. Routing the device without an effective pattern wastes space, increases the package size, and requires more layers in the substrate, all undesirable outcomes. Medium to low pad count devices do not present a significant problem, and can be routed using conventional technology, but high pad count devices with a pitch less than 0.8 millimeter require a new paradigm for routing the traces out of the array. Without this, layer count becomes excessive, adversely affecting the fabrication cost and reliability of the BGA.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
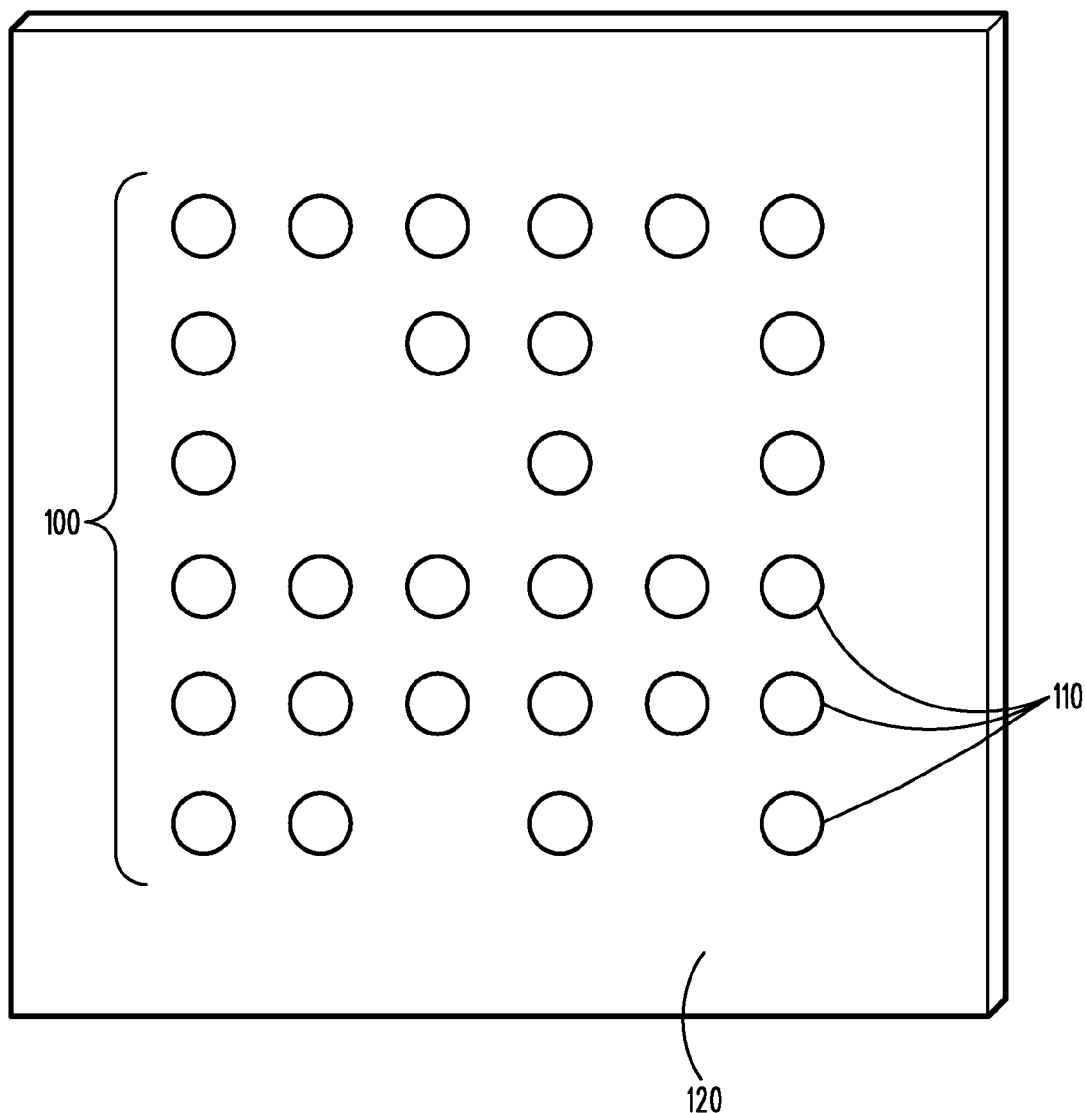
FIG. 1 is an example of a spatially optimized ball grid array, in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, dashed lines and some numbers are added in FIGS. 2 and 3 to aid in understanding the invention.

DETAILED DESCRIPTION

Before describing in detail embodiments that are in accordance with the present invention, it should be observed that the embodiments reside primarily in combinations of method and apparatus components related to arranging the surface mount pads on a ball grid array package in a spatially optimized pattern. Accordingly, the apparatus components and methods have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

A method and apparatus for spatially optimizing the arrangement of surface mount pads on a ball grid array package is described. Referring now to FIG. 1, an array 100 containing a finite number T of surface mount pads 110 is arranged on an insulating substrate 120 in rows and columns. The substrate 120 serves as the base of the ball grid array package, as is known in the art, and is generally a multilayer printed circuit board containing surface mount pads and signal lines on an exterior layer, inner layers having additional signal lines, and a second opposing exterior layer on the opposite side of the substrate arranged for mounting an integrated circuit die. The substrate also contains microvias, small holes that provide an electrically conductive pathway through one or more layers. Although depicted in FIG. 1 as a regular array, that is, an array that is arranged into a uniform and evenly spaced matrix, the array may also be an irregular array. The surface mount pads are generally circular, ovoid, square, rectangular or polygonal in shape, as is well known in the art, with an effective diameter less than or equal to 0.4 millimeter. Although the drawing of FIG. 1 shows a 6×6 depopulated array for the sake of simplicity and clarity, the method and apparatus of our invention finds more efficient application in high density surface mount packages with a large number of pads, that is, packages having more than 200 pads and having rows and columns situated so that they are less than or equal to 0.5 millimeters center-to-center.

Figure 2:
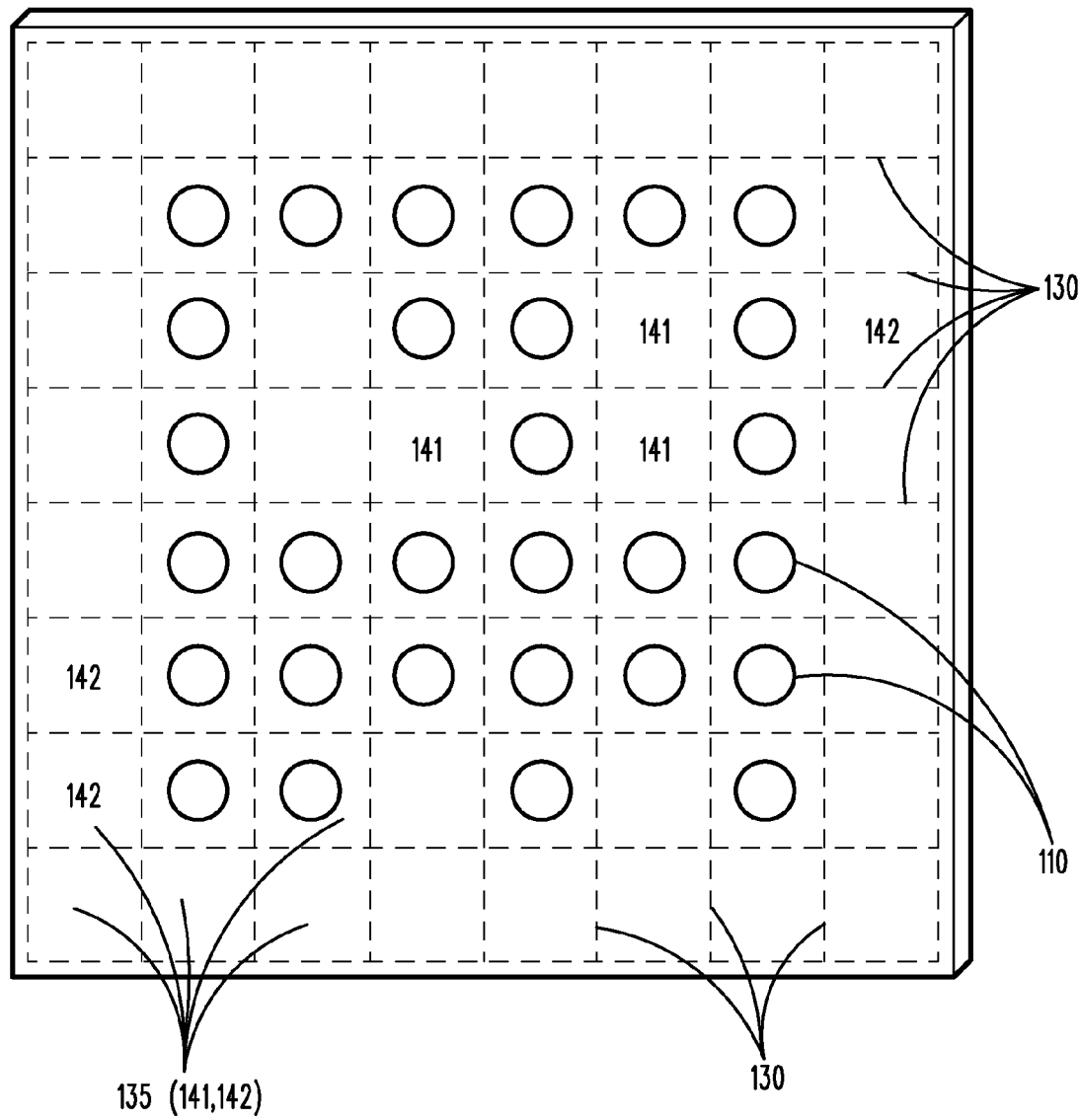
FIG. 2 is a schematic of the layout of a spatially optimized ball grid array, in accordance with some embodiments of the invention.

Referring now to FIG. 2, dashed grid lines 130 are drawn on the substrate for purposes of illustration, and are not part of the ball grid array package, but merely serve to define spaces or locations 135 on the substrate to aid the reader in understanding the invention. In this case, there are 64 unique locations. Some of these spaces contain the surface mount pads 110, and others are empty. Since each surface mount pad 110 will later receive a solder ball for mounting to a mother board, each pad must also have a signal line and/or microvia associated with it to carry a signal from the surface mount pad through the substrate to a predefined location on the opposing side for connection to the integrated circuit. Industry design guidelines suggest that the microvias should not be located within the perimeter of the surface mount pad, so each surface mount pad must be routed to a remote microvia. A spatially optimized array provides empty spaces 141, 142 in strategic areas to fan out the signal lines and to locate the microvias. Judicious location of the empty spaces 141, 142 maximizes the number of options for location of the microvias. The pattern should be originated with the maximum amount of "depopulated" pad rows and/or pad columns between the populated pad areas to minimize "landlocked" pads, i.e. those pads that do not have an empty space adjacent to them. Optimally an entire depopulated ring might be situated within the array.

Figure 3:
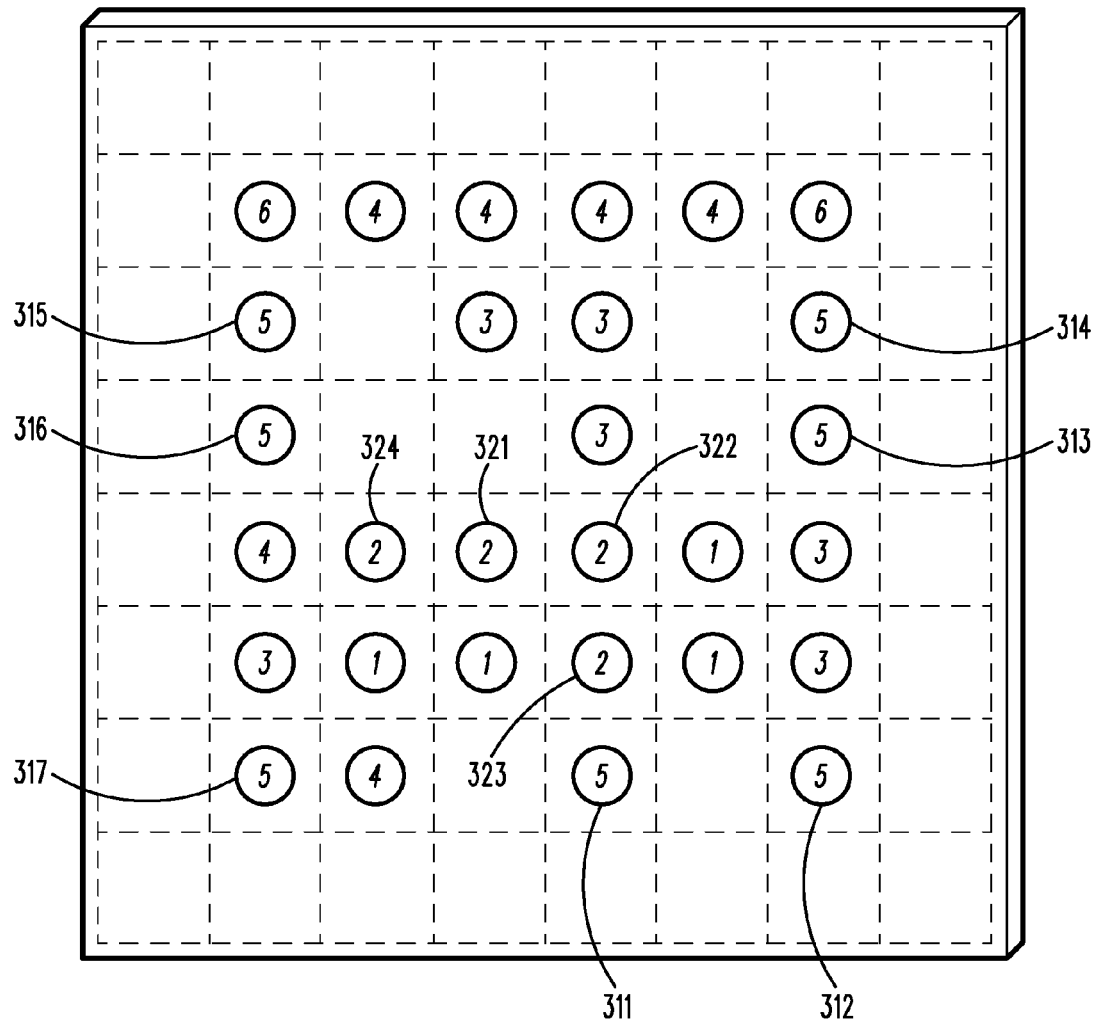
FIG. 3 is a further schematic of the layout of a spatially optimized ball grid array, in accordance with some embodiments of the invention.

Referring now to FIG. 3, the number of empty spaces adjacent to each pad 110 is counted, and that number is assigned to that pad. For example, pads 311-317 each have five (5) empty spaces adjacent to them. Likewise, pads 321-324 each have two (2) empty spaces adjacent to them, and so on. After calculating the number of empty spaces adjacent to each pad, the pads are assigned to groups based on their number of adjacent empty spaces $P_x$. The number of empty spaces adjacent to each pad is shown as superimposed in italic on the pads in FIG. 3 only to aid the reader, and this printed italic number forms no part of the finished ball grid array package. In this example, we have 6 groups, but as a generalization, one will have N groups of pads, N being a positive integer. Each of the groups is consecutively numbered $G_x$, where x varies stepwise from 1 to N, or in this example, $G_1$, $G_2$, $G_3$, $G_4$, $G_5$, $G_6$. The relationship of groups $G_x$, pads $P_x$, and empty adjacent spaces $S_z$ is shown in TABLE 1.

TABLE 1

| Group number ($G_x$) | | Adjacent spaces ($S_z$) | | Number of pads ($P_x$) | Fanout Possibilities ($P_x * S_z$) |
|---|---|---|---|---|---|
| $G_1$ | 1 | $S_0$ | 0 | $P_1$ | 0 | 0 |
| $G_2$ | 2 | $S_1$ | 1 | $P_2$ | 4 | 4 |
| $G_3$ | 3 | $S_2$ | 2 | $P_3$ | 4 | 8 |
| $G_4$ | 4 | $S_3$ | 3 | $P_4$ | 6 | 18 |
| $G_5$ | 5 | $S_4$ | 4 | $P_5$ | 6 | 24 |
| $G_6$ | 6 | $S_5$ | 5 | $P_6$ | 7 | 35 |
| $G_7$ | 7 | $S_6$ | 6 | $P_7$ | 2 | 12 |

The number of fanout possibilities, that is, the number of empty adjacent spaces in the group, and therefore the number of possible directions or routes that a signal line can take from the pad 110 to a microvia, are then calculated for each group. Obviously, it is the goal of the designer to maximize the number of fanout possibilities in order to have the most flexibility in routing the signal lines. The number of fanout possibilities is calculated by multiplying the number of empty adjacent spaces by the number of members in that group, or $(P_x * S_z)$, as shown in TABLE 1. The total number of fanout possibilities is then calculated by summing up the fanout possibilities FP for each of the groups 1 through N, $\Sigma_1^N (P_x * S_z)$. In this example, the total number of fanout possibilities FP for the spatially optimized array equals 101. A Quality Score that reflects the degree of spatial optimization of the array, is calculated by dividing the total fanout possibilities by the number of surface mount pads in the array, or FP/T. In this example, the Quality Score is 3.48. We find that a Quality Score greater than 2 generally indicates that the array has been optimized to a high degree, providing the designer with a wide variety of options in routing the various signal lines. Another measure of the quality of the optimization can be determined by measuring the percentage of the substrate surface area that is covered by surface mount pads. This ratio is determined by calculating the total area of the surface mount pads 110 in the array 100, and dividing this area by the area of the bottom side of the substrate 120. The area of each pad is calculated by standard mathematical formulae. Obviously, higher percentage of area covered indicates higher density arrays, and we find that our spatially optimization tool is most useful when applied to high density ball grid array packages having a coverage percentage greater than 30%.

Figure 4:
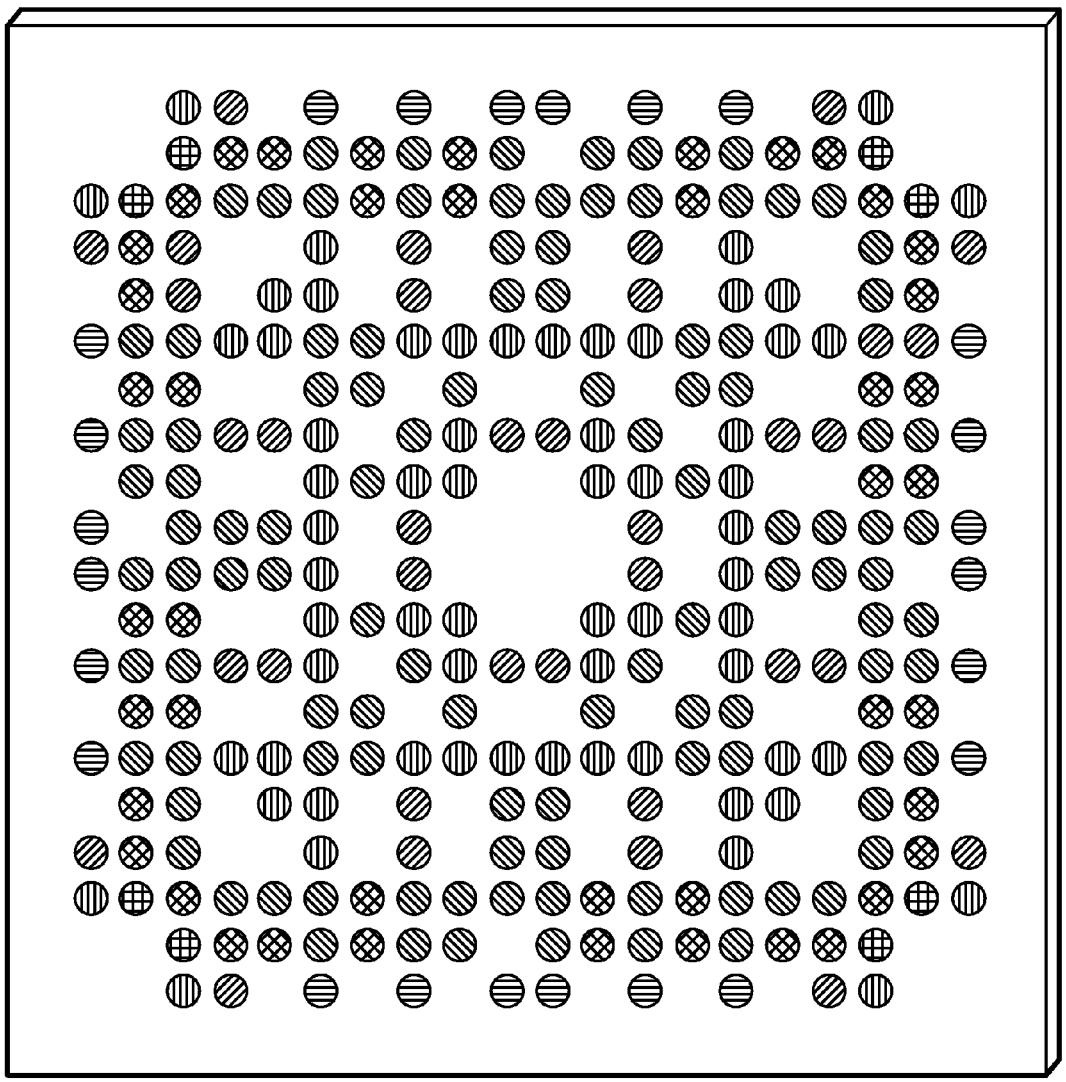
FIG. 4 is another example of a spatially optimized ball grid array, in accordance with some embodiments of the invention.
Figure 4:
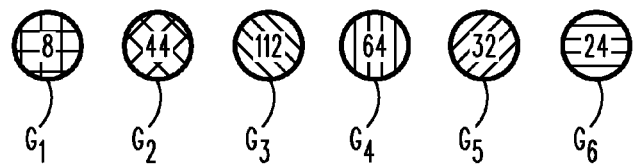

Referring now to FIG. 4, one example of a spatially optimized array having 284 pads arranged on a 0.4 millimeter pitch is shown. The legend denotes the number of empty adjacent spaces for each group of pads. TABLE 2 contains the summary data for the layout. In this example, the total number of fanout possibilities FP for the spatially optimized array equals 708. A Quality Score that reflects the degree of spatial optimization of the array, is calculated by dividing the total fanout possibilities by the number of surface mount pads in the array, or FP/T. In this example, the Quality Score is 2.49.

TABLE 2

| Group number ($G_x$) | | Adjacent spaces ($S_z$) | | Number of pads ($P_x$) | Fanout Possibilities ($P_x * S_z$) |
|---|---|---|---|---|---|
| $G_1$ | 1 | $S_0$ | 0 | $P_1$ | 8 | 0 |
| $G_2$ | 2 | $S_1$ | 1 | $P_2$ | 44 | 44 |
| $G_3$ | 3 | $S_2$ | 2 | $P_3$ | 112 | 224 |
| $G_4$ | 4 | $S_3$ | 3 | $P_4$ | 64 | 192 |
| $G_5$ | 5 | $S_4$ | 4 | $P_5$ | 32 | 128 |
| $G_6$ | 6 | $S_5$ | 5 | $P_6$ | 24 | 120 |

In summary, a method to spatially optimize the layout of surface mount pads for a ball grid array package has been described, and the resulting layout and package have also been described. The array contains a finite number T of surface mount pads less than or equal to 0.4 millimeter in diameter arranged in rows and columns. The rows and columns are situated so that they are less than or equal to 0.5 millimeters center-to-center. Each pad is situated and located in the array to maximize the number of empty spaces that are adjacent to the pad, in order to maximize the number of fanout possibilities for that pad. The empty spaces are useful for routing signal lines away from the pad and for locating microvias to route the signal upward through the various layers of the substrate for interconnection to the integrated circuit on the opposite side of the array. The number of fanout possibilities for each group is calculated, and then the total number of fanout possibilities, FP, is calculated. The resulting spatially optimized pattern has a Quality Score, FP/T, that is equal to or greater than 2. The disclosed invention enables one to design fine pitch BGA packages (<0.4 mm pitch) such that the number of microvias is reduced compared to the prior art and a large number of the signal lines are routed on the top layer of the substrate. This simplifies board level interconnect and improves overall electrical performance of the BGA package by reducing interconnect length and associated inductances. It also improves the mechanical robustness of the package.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A spatially optimized pattern for surface mount pads on a ball grid array package, comprising:
    an array of surface mount pads arranged in rows and columns, and spaced less than or equal to 0.5 millimeters measured center-to-center, the array comprising T pads divided into N groups of pads, where T and N are positive integers;
    each group of pads consecutively numbered $G_x$ where $1 \leq X \geq N$;
    each pad in each consecutively numbered group $G_x$ having $S_z$ adjacent empty spaces, where $S_z=(G_x-1)$;
    a number of pads $P_x$ in each of groups $G_x$ equivalent to the total number of pads having the same quantity $S_z$ of adjacent empty spaces, where $0 \leq X \geq T$;
    each of consecutively numbered groups $G_x$ having $(P_x*S_z)$ fanout possibilities; a total number of fanout possibilities, FP, equal to $\Sigma_1^N (P_x*S_z)$;
    wherein the spatially optimized pattern has a quality score equal to FP/T; and wherein the quality score is greater than or equal to 2.0;
    wherein a total area A of the surface mount pads is $A=T*(\pi*(pad\ diameter/2)^2)$ and wherein the A/(the area of the bottom surface of the ball grid array) is greater than 0.3.

2. A spatially optimized pattern for surface mount pads on a bottom surface of a ball grid array package, comprising:
    an array of surface mount pads having a diameter less than or equal to 0.4 millimeter arranged in rows and columns on the bottom surface of the ball grid array, and spaced less than or equal to 0.5 millimeter center-to-center, the array comprising T pads divided into N groups of pads, where T and N are positive integers;
    each group of pads consecutively numbered $G_x$ where $1 \leq X \geq N$;
    each pad in each consecutively numbered group $G_x$ having $S_z$ adjacent empty spaces, where $S_z=(G_x-1)$;
    a number of pads $P_x$ in each of groups $G_x$ equivalent to the total number of pads having the same quantity $S_z$ of adjacent empty spaces, where $0 \leq X \geq T$;
    each of consecutively numbered groups $G_x$ having $(P_x*S_z)$ fanout possibilities; a total number of fanout possibilities, FP, equal to $\Sigma_1^N (P_x*S_z)$;
    wherein the spatially optimized pattern has a quality score equal to FP/T;
    wherein the quality score is greater than or equal to 2.0;
    wherein a total area A of the array of surface mount pads is $A=T*(\pi*(diameter/2)^2)$;
    and wherein A/(area of the bottom surface of the ball grid array package) is greater than 0.3.

3. A method for spatially optimizing surface mount pads on the bottom surface of a ball grid array package by arranging the pads so as to maximize the number of empty spaces adjacent to each pad, comprising:
    arranging an array of T surface mount pads having a diameter less than or equal to 0.4 millimeter into rows and columns;
    arranging the rows and columns to be less than or equal to 0.5 millimeters center-to-center;
    arranging the pads in the array so as to maximize the number of empty spaces $S_z$ adjacent each pad;
    grouping the array into N groups of pads such that the members of each group have the same number of emit spaces $S_z$ adjacent each pad, the N groups of pads groups consecutively numbered $G_x$ where $1 \leq X \geq N$.
    a number of pads $P_x$ in each of groups $G_x$ equivalent to the total number of pads having the same quantity $S_z$ of adjacent empty spaces, where $0 \leq X \geq T$;
    calculating the number of fanout possibilities $(P_x*S_z)$ for each group $G_x$;
    calculating the total number of fanout possibilities, FP, equal to $\Sigma_1^N (P_x*S_z)$;
    wherein the spatially optimized pattern has a quality score equal to FP/T, and the quality score is greater than or equal to 2.0;
    wherein a total area of the surface mount pads $A=T*(\pi*(diameter/2)^2)$ and wherein A/(area of the bottom surface of the ball grid array) is greater than 0.3.

* * * * *

UNITED STATES PATENT AND TRADEMARK OFFICE
CERTIFICATE OF CORRECTION

PATENT NO. : 8,102,667 B2  
APPLICATION NO. : 12/259250  
DATED : January 24, 2012  
INVENTOR(S) : Underwood et al.

It is certified that error appears in the above-identified patent and that said Letters Patent is hereby corrected as shown below:

In Column 6, Line 36, in Claim 3, delete "emit" and insert -- empty --, therefor.

In Column 6, Line 38, in Claim 3, delete "N." and insert -- N; --, therefor.

Signed and Sealed this
Eighteenth Day of December, 2012

David J. Kappos
*Director of the United States Patent and Trademark Office*